(12) United States Patent
Parpajola

(10) Patent No.: US 11,934,170 B2
(45) Date of Patent: Mar. 19, 2024

(54) OPERATING METHOD OF A NUMERICAL-CONTROL MACHINE TOOL AND DETECTION DEVICE FOR IMPLEMENTING SUCH METHOD

(71) Applicant: PARPAS S.p.A., Cadoneghe (IT)

(72) Inventor: Vladi Parpajola, Cadoneghe (IT)

(73) Assignee: PARPAS S.P.A., Cadoneghe (IT)

(*) Notice: Subject to any disclaimer, the term of this patent is extended or adjusted under 35 U.S.C. 154(b) by 24 days.

(21) Appl. No.: 17/629,307

(22) PCT Filed: Oct. 4, 2019

(86) PCT No.: PCT/IB2019/058468
§ 371 (c)(1),
(2) Date: Jan. 21, 2022

(87) PCT Pub. No.: WO2021/014201
PCT Pub. Date: Jan. 28, 2021

(65) Prior Publication Data
US 2022/0317652 A1 Oct. 6, 2022

(30) Foreign Application Priority Data

Jul. 23, 2019 (IT) .................. 102019000012681

(51) Int. Cl.
*G05B 19/25* (2006.01)
*G01C 9/02* (2006.01)

(52) U.S. Cl.
CPC ............ *G05B 19/251* (2013.01); *G01C 9/02* (2013.01)

(58) Field of Classification Search
CPC ..................................................... G01C 9/02

USPC ......................................................... 700/56
See application file for complete search history.

(56) References Cited

U.S. PATENT DOCUMENTS

| 5,834,623 | A | 11/1998 | Ignagni et al. |
| 6,925,850 | B2 | 8/2005 | Comer et al. |
| 8,131,385 | B2 * | 3/2012 | Yuzawa .............. B23Q 17/2485 |
| | | | 700/214 |

(Continued)

FOREIGN PATENT DOCUMENTS

| EP | 2208572 A1 | 7/2010 |
| WO | WO 2015082935 | 6/2015 |

OTHER PUBLICATIONS

Vogl et al, Inertial Measurement Unit for On-Machine Diagnostics of Machine Tool Linear Axes, 2016 Annual Conference of the Prognostics and Health Management Society, Oct. 1, 2016 (Oct. 1, 2016), pp. 2-6.

(Continued)

*Primary Examiner* — Md Azad
(74) *Attorney, Agent, or Firm* — McCarter & English, LLP

(57) ABSTRACT

An operating method of a numerical-control machine tool characterized in that it comprises the steps of providing the tool-carrying head of the numerical-control machine tool with a detection device adapted to measure the values of the tilting of the detection device relative to a predetermined reference inertial plane; and moving the tool-carrying head in space so as to place said detection device in succession in a multitude of control points distributed on a first detection plane, and create at least a first digital map that contains the tilting values of the detection device relative to the reference inertial plane, in each of said control points.

14 Claims, 3 Drawing Sheets

(56) References Cited

U.S. PATENT DOCUMENTS

| | | | |
|---|---|---|---|
| 8,786,243 B2 | 7/2014 | Mori et al. | |
| 2004/0233461 A1* | 11/2004 | Armstrong | G01S 5/16 |
| | | | 356/620 |
| 2005/0209712 A1* | 9/2005 | Sagasaki | G05B 19/4093 |
| | | | 700/86 |
| 2005/0234671 A1* | 10/2005 | Morfino | G05B 19/4015 |
| | | | 702/95 |

OTHER PUBLICATIONS

PCT International Search Report and Written Opinion dated May 7, 2020 for PCT Application No. PCT/IB2020/058468.
PCT/IB2020/058468, Oct. 4, 2019, WO 2021/014201 A1.
Gregory W. Vogl et al., Inertial Measurement Unit for On Machine Diagnostics of Machine Tool of Machine Tool Linear Axes, 2016 Annual Conference of the Prognostics and Health Management Society, pp. 206, figs. 1-7.
English Translation of Russian Office Action dated Feb. 9, 2023 for Russian Patent Application No. 2022101231.
English Translation of Russian Search Report dated Feb. 9, 2023 for Russian Patent Application No. 2022101231.
European Communication Pursuant to Rule 114(2) dated Jul. 18, 2023.
ISO-230-1: 2012. Test Code for Machine Tool—Part 1: Geometric Accuracy of Machines Operating Under No-Load or Quasi-Static Conditions, Third Edition Publication of Mar. 2012.
MEAX Level 2Axis Levelling (P-0270-GB MEAX Level 2019) (Document properties: Created/Modify: Jul. 6, 2019); http://web.archive.org/web/20230301132824/https://acoem.us/wp-content/uploads/2019/05/MEAX-Level-Brochure <http://web.archive.org/web/20230301132824/https:/acoem.us/wp-content/uploads/2019/05/MEAX-Level-Brochure>.

\* cited by examiner

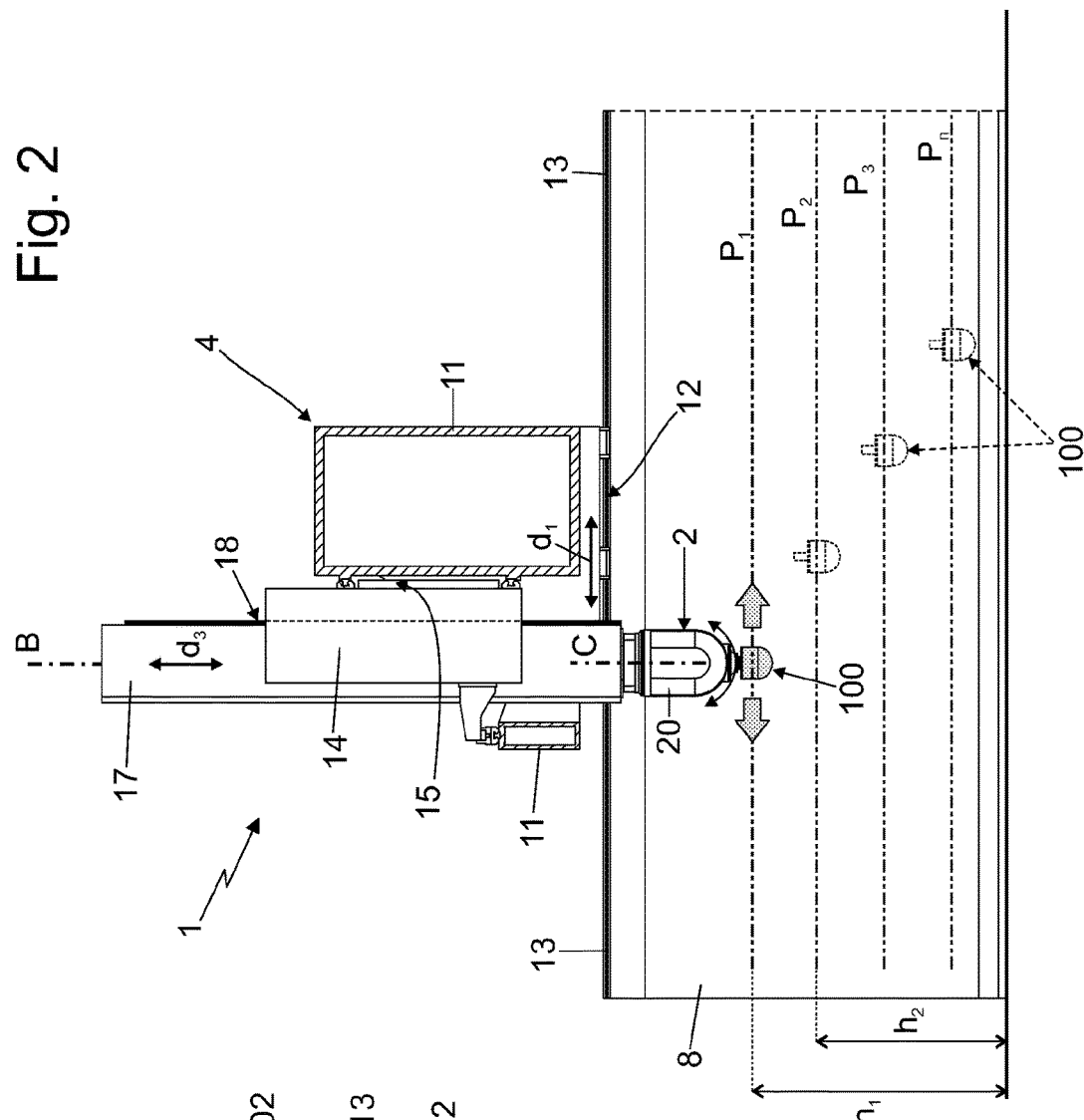
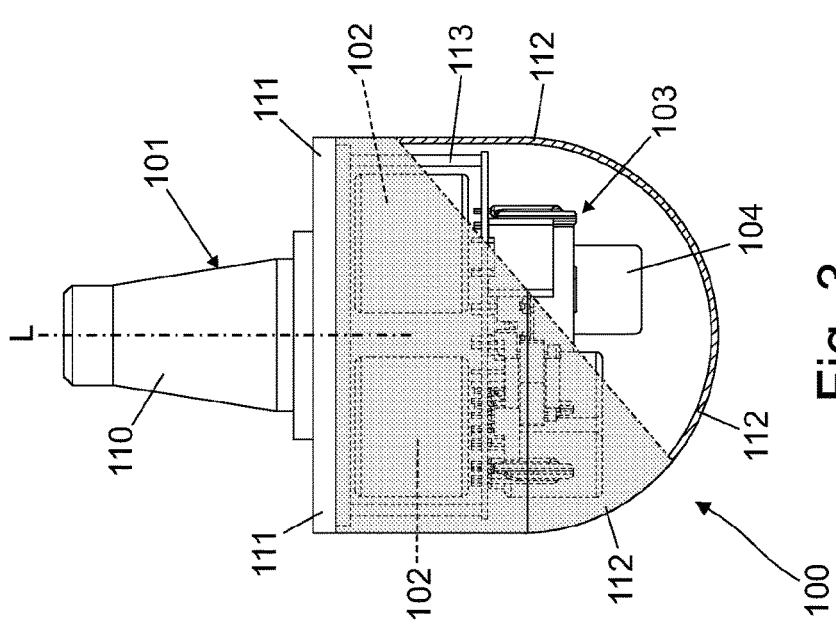

OPERATING METHOD OF A NUMERICAL-CONTROL MACHINE TOOL AND DETECTION DEVICE FOR IMPLEMENTING SUCH METHOD

CROSS-REFERENCE TO RELATED APPLICATIONS

This application is a 35 U.S.C. § 371 National Stage filing of International Application No. PCT/IB2019/058468, filed on Oct. 4, 2019, which Patent Application claims priority from Italian Patent Applications No. 102019000012681 filed on Jul. 23, 2019, the entire disclosures of which are incorporated herein by reference.

TECHNICAL FIELD

The invention relates to an operating method of a numerical-control machine tool and to a detection device for implementing such method.

More in detail, the invention relates to a method of calibrating a numerical-control gantry milling machine. Use to which the following description will make explicit reference, without however loosing in generality.

BACKGROUND ART

As it is known, numerical-control gantry milling machines usually comprise: a large, straight, horizontal support crossbeam with a high-rigidity structure, which extends horizontally above the piece-holder platform, with the two axial ends resting in sliding manner on two lateral shoulders vertically rising from the basement, on opposite sides of the piece-holder platform, so as to allow the support crossbeam to travel horizontally above the piece-holder platform in a horizontal direction perpendicular to the longitudinal axis of the beam; a movable carriage, which is fixed in axially sliding manner to a lateral side of the support crossbeam, so as to be able to move along the crossbeam parallel to the longitudinal axis of the crossbeam; a head-holder beam which is fixed to the movable carriage in a vertical position, with the capability of sliding on the movable carriage parallel to its longitudinal axis, i.e. in a vertical direction, so as to be able to vary the distance from the piece-holder platform beneath; and an electrically-operated tool-carrying head which is provided with a tool-holder spindle usually swivelling about two reference axes orthogonal to one another, and which is fixed on the lower end of the head-holder beam, so that the tool mounted on the tool-holder spindle can reach the piece to be machined stationary resting on the piece-holder platform beneath.

The abovementioned gantry milling machines are finally provided with an electronic control apparatus that commands/controls the different motors and/or electromechanical actuators that are designated to move the crossbeam, the movable carriage and the head-holder beam, and the motors and/or electromechanical actuators of the tool-carrying head that control the angular position/tilting of the swivelling spindle, as a function of the signals arriving from a system of sensors that detects the position of the crossbeam on the raised lateral shoulders of the basement, the position of the movable carriage on the crossbeam, the position of the head-holder beam on the movable carriage, and finally the angular position/tilting of the spindle relative to the two additional reference axes.

Clearly, the final result of the machining of a numerical-control machine tool (compliance with the piece dimensional tolerances, with the surface quality/finishing, etc.) is significantly influenced by the dynamic and static accuracy of the movement of the tool-carrying head and of its swivelling spindle.

In other words, the final result of the machining of a numerical-control machine tool is significantly influenced by the accuracy with which the machine tool succeeds in keeping, during the machining of the piece, the actual spatial position and orientation of the tool (i.e. the space coordinates of the centre/vertex of the tool and the orientation of the tool vector) coincide with the nominal/theoretical spatial position and orientation required by the machining.

Therefore, in order to carry out high-precision machining processes, it is necessarily to periodically detect possible differences/errors in the movement/position along the reference/moving axes of the machine, which are usually due to unexpected deformations of parts of the supporting structure of the machine tool and/or of the foundation, so that the electronic control apparatus of the machine can compensate them.

Like many numerical-control machine tools, even large numerical-control gantry milling machines are currently calibrated with the aid of a laser detection apparatus or with the aid of a ball sensing and calibrating system (such as, for example, the KindmaticsOpt system of Heidenhain), which are capable of measuring differences/errors of movement along the reference axes of the machine and, in addition, are capable of additionally controlling the parallelism and the planarity of the different movements of the machine.

Unfortunately, calibration of the machine by means of a laser detection apparatus or by means of a sensing system requires much time and this fact negatively affects the hourly productivity of the machine tool.

In addition, operation and precision of the laser detection apparatus is significantly affected by the quantity of powders in suspension in the work area of the machine.

Furthermore, when placed in the work area of the machine, the piece to be machined can temporarily prevent the laser beam from reaching/seeing the reflecting mirror located on the spindle of the machine, thus preventing the detection apparatus from determining the real position of the spindle.

As a consequence, except exceptional cases, machine-tool calibration via laser must be carried out with the piece-holder platform completely free, with all the operating problems that this entails.

DISCLOSURE OF INVENTION

Aim of the present invention is to obviate the operating limits affecting laser detection apparatuses and the like.

In compliance with these aims, according to the present invention there is provided an operating method of a numerical-control machine tool as defined in claim 1 and preferably, though not necessarily, in any one of the claims depending on it.

In addition, according to the present invention it is realized a detection device as defined in claim 10 and preferably, though not necessarily, in any one of the claims depending on it.

BRIEF DESCRIPTION OF THE DRAWINGS

The invention will now be described with reference to the accompanying drawings, showing a non-limiting embodiment thereof, wherein:

FIG. 2 is a side view of the machine tool shown in FIG. 1, with parts in section and parts removed for sake of clarity;

FIG. 3 is a front view of the detection device shown in FIGS. 1 and 2, with parts in section and parts removed for sake of clarity; whereas

BEST MODE FOR CARRYING OUT THE INVENTION

Figure 1:
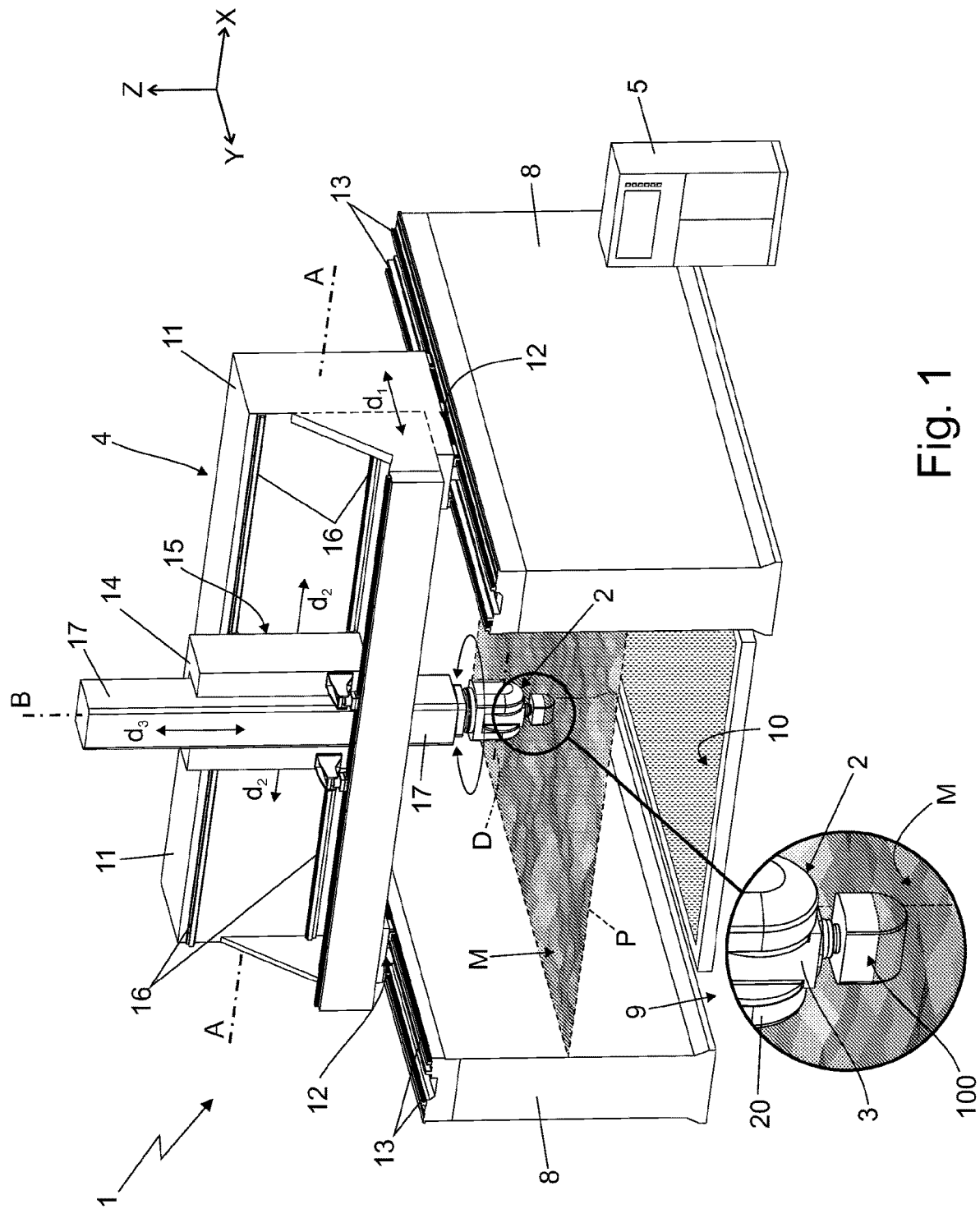
FIG. 1 is an axonometric view of a numerical-control machine tool during a step of the operating method according to the teachings of the present invention, with parts removed for sake of clarity.

With reference to FIGS. 1 and 2, number 1 denotes as a whole a numerical-control machine tool that finds particularly advantageous use in the milling or boring of large-sized metal pieces.

The machine tool 1 basically comprises: a tool-carrying head 2 which is provided with a tool-holder spindle 3 capable of accommodating a generic tool (not shown), and which is preferably also capable of rotating/swivelling the tool-holder spindle 3 around one or more rotation/reference axes inclined relative to one another; and a movable supporting structure 4 that stably supports the tool-carrying head 2 and is capable of moving, on command, the tool-carrying head 2 in the space surrounding the piece to be machined.

More in detail, the movable supporting structure 4 is preferably provided with a series of motors and/or electromechanical actuators, which are capable of moving the different parts of the supporting structure 4 in a controlled manner, so as to move the tool-carrying head 2 and its tool-holder spindle 3 in the space.

Moreover the machine tool 1 additionally comprises an electronic control device 5 that controls/commands the various moving members of the movable supporting structure 4 and, preferably, also of the tool-carrying head 2, so as to move, during the machining of the piece, the tool-carrying head 2 and its tool-holder spindle 3 in the space around the piece to be machined, thus to automatically carry out the predetermined machining of the piece.

More in detail, the electronic control device 5 is preferably adapted to control the various moving members of the movable supporting structure 4 and preferably also the different moving members of the tool-carrying head 2, based on the signals arriving from a series of position sensors (not shown in the figures) that are suitably placed/distributed on the movable supporting structure 4 and preferably also on the tool-carrying head 2, so as to be able to automatically move and orient the tool-holder spindle 3 in the space around the piece to be machined, in order to automatically carry out the previously scheduled piece machining operation/s.

Preferably, the tool-holder spindle 3 is furthermore a motor-driven spindle, i.e. a spindle capable of driving into rotation of the tool around its longitudinal axis.

With reference to FIGS. 1 and 2, in the example shown, in particular, the movable supporting structure 4 preferably comprises: two rectilinear lateral shoulders 8 which rise/stand preferably vertically from a basement 9 preferably made of reinforced concrete, and which extend horizontally on the same basement 9 side by side, so as to form/delimit a substantially rectilinear, longitudinal corridor that preferably extends astride of the vertical midplane of the machine; and a piece-holder platform 10 preferably made of metal material, which is adapted to accommodate, resting thereon, the piece to be machined and which is located on the basement 9, within the longitudinal corridor laterally delimited by the two lateral shoulders 8.

More in detail, the two lateral shoulders 8 are preferably substantially parallel to one another and, hence, extend on the basement 9 without gaps, on opposite sides of the vertical midplane of the machine, remaining parallel to the same vertical midplane. Furthermore, the two lateral shoulders 8 are preferably made of metal material and, optionally, are substantially parallelepiped in shape.

The piece-holder platform 10, on the other hand, is preferably arranged astride the vertical midplane of the machine and preferably is firmly anchored to the basement 9 beneath.

With reference to FIG. 1, preferably the movable supporting structure 4 moreover comprises: a substantially straight and with a high-rigidity structure, large support crossbeam 11 which is preferably made of metal material, extends astride the lateral shoulders 8 substantially horizontally and perpendicularly to the vertical midplane of the machine, and has the two axial ends coupled in axially sliding manner to the two lateral shoulders 8, so as to be able to move along the two lateral shoulders 8, at a predetermined height from the piece-holder platform 10 beneath, in a first horizontal direction $d_1$ substantially parallel to the longitudinal axis of the corridor and perpendicular to the longitudinal axis A of the support crossbeam 11; and a preferably electrically-operated or hydraulically-operated, first electronically-controlled drive device 12 which is capable of moving, on command, the support crossbeam 11 back and forth along the lateral shoulders 8, in the direction $d_1$.

Conventionally, the longitudinal axis A of support crossbeam 11 is moreover substantially parallel to the Cartesian axis X, so that the direction $d_1$ is substantially parallel to Cartesian axis Y.

Preferably, the longitudinal corridor delimited by the two lateral shoulders 8 and the support crossbeam 11 moreover have a length of more than 3 metres.

With reference to FIG. 1, in the example shown, in particular, each lateral shoulder 8 preferably has, at the top, at least one and preferably a pair of rectilinear rail 13, which extend horizontally and parallel to the lateral shoulders 8, i.e. parallel to the Cartesian axis Y and to the machine vertical midplane, preferably substantially over the entire length of the lateral shoulder 8.

On the other hand, each axial end of the support crossbeam 11 is preferably provided with a resting sliding block, which is fitted/rests in axially sliding manner directly on the rectilinear rail/s 13 arranged on top of the lateral shoulder 8, so as to allow the support crossbeam 11 to move back and forth along the lateral shoulders 8 in direction $d_1$.

The drive device 12, on the other hand, is preferably structured so as to move the two resting sliding blocks of the support crossbeam 11 in a synchronized manner along the corresponding rectilinear rails 13, so as to be able to move, on command, the entire support crossbeam 11 in direction $d_1$, always keeping it parallel to itself and orthogonal to the vertical midplane of the machine.

In the example shown, in particular, the drive device 12 preferably includes a pair of linear electric motors, each of which is located on the top of a respective lateral shoulder 8 and is capable of moving the corresponding resting sliding block of the crossbeam back and forth along the rectilinear rails 13.

More in detail, each linear electric motor preferably comprises a fixed stator track (not shown in the figures) and a travelling slide (not shown in the figures), that is movable grazing the stator track. The stator track extends on top of the lateral shoulder 8, between the rectilinear rails 13. The travelling slide, in turn, is rigidly fixed on the resting sliding block of the support crossbeam 11, so as to locally face and graze a portion of the stator track.

However, in a less sophisticated embodiment, the two resting sliding block of support crossbeam 11 could be moved back and forth along the rectilinear rails 13 via rack moving mechanism or via a recirculating ball screw moving mechanism, in both cases operated by an electric or hydraulic motor.

With reference to FIGS. 1 and 2, preferably the machine movable supporting structure 4 moreover comprises: a movable carriage 14, which is fixed to a lateral side of the support crossbeam 11 with the capability of freely moving along the support crossbeam 11 parallel to the longitudinal axis A of the crossbeam, i.e. in a second horizontal direction $d_2$ substantially perpendicular to direction $d_1$ and to the vertical midplane of the machine; and a second, preferably electrically- or hydraulically-operated, electronically-controlled drive device 15 which is capable of moving, on command, the movable carriage 14 back and forth along the support crossbeam 11 in horizontal direction $d_2$.

Conventionally the longitudinal axis A of support crossbeam 11 is additionally substantially parallel to the Cartesian axis X, so that direction $d_2$ is substantially parallel to the same Cartesian axis.

More in detail, in the example shown, the support crossbeam 11 preferably has, on the lateral side, at least one and preferably a pair of rectilinear rails 16 that extend horizontally and parallel to the crossbeam longitudinal axis A, preferably substantially for the whole length of support crossbeam 11. The movable carriage 14, in turn, is preferably coupled in axially sliding manner to the rectilinear rail or rails 16.

The drive device 15, on the other hand, preferably includes a single linear electric motor, which is located on the lateral side of support crossbeam 11 and is capable of moving the movable carriage 14 back and forth along the rectilinear rails 16, in direction $d_2$.

More in detail, the linear electric motor of drive device 15 preferably comprises a fixed stator track (not shown) and a travelling slide (not shown) which is movable grazing the stator track. The stator track extends on the lateral side of support crossbeam 11, between the rectilinear rails 16. The travelling slide, in turn, is rigidly fixed to the movable carriage 14 so as to locally face and graze a portion of the stator track.

In a less sophisticated embodiment, also the movable carriage 14 could be moved back and forth along the rectilinear rails 16 via a rack moving mechanism or via a recirculating ball screw moving mechanism, in both cases operated by an electric or hydraulic motor.

With particular reference to FIGS. 1 and 2, the movable supporting structure 4 preferably additionally comprises: a substantially straight, head-holder beam 17 which is preferably made of metal material, and is fixed to the movable carriage 14 with its longitudinal axis B substantially perpendicular to the crossbeam longitudinal axis A and with the capability of sliding on the movable carriage 14 parallel to its longitudinal axis B; and a third, preferably electrically- or hydraulically-operated, electronically-controlled drive device 15 which is capable of moving, on command, the head-holder beam 17 relative to the movable carriage 14 parallel to the longitudinal axis B of the same head-holder beam 17, so as to be able to vary, on command, the height of the lower end of the head-holder beam 17 from the basement 9 beneath.

More in detail, the head-holder beam 17 is preferably fixed to the movable carriage 14 in a substantially vertical position, with the capability of moving axially on the movable carriage 14 in a direction $d_3$ substantially vertical and substantially perpendicular to directions $d_1$ and $d_2$.

Conventionally, therefore, the longitudinal axis B of head-holder beam 17 is substantially parallel to Cartesian axis Z, thus direction $d_3$ is substantially parallel to the same Cartesian axis.

In the example shown, in particular, the head-holder beam 17 preferably basically consists of a large, straight tubular element with a high-rigidity structure and with a preferably rectangular or square cross-section, which is preferably made of metal material and is coupled to the movable carriage 14 in axially sliding manner.

The drive device 18, on the other hand, preferably comprises: a vertical axis, recirculating ball screw (not shown in the figures) which is interposed between the movable carriage 14 and the head-holder beam 17; and an electric motor (not shown in the figures) which is housed inside the movable carriage 14 and is adapted to drive into rotation the recirculating ball screw so as to be able, on command, to move axially the head-holder beam 17 to bring closer or move away the lower end of the beam from the basement 9 beneath, i.e. so as to move the head-holder beam 17 in direction $d_3$.

With reference to FIGS. 1 and 2, the tool-carrying head 2 is preferably fixed in rigid manner to the lower end of the head-holder beam 17, preferably with the capability of rotating about a first reference axis C which is preferably substantially parallel to, and optionally also coinciding with, the longitudinal axis B of the head-holder beam 17. The tool-holder spindle 3 of tool-carrying head 2, on the other hand, is preferably capable of swivelling around a second reference axis D inclined relative to reference axis C.

Preferably the axis D is moreover substantially perpendicular to axis C and, hence, to the longitudinal axis B of head-holder beam 17.

In other words, the tool-carrying head 2 is fixed to the distal end of the movable supporting structure 4 preferably with the capability of rotating/swivelling the tool-holder spindle 3 around two additional reference axes C and D that are preferably orthogonal to one another.

More in detail, with reference to FIGS. 1 and 2, in the example shown the tool-carrying head 2 is preferably provided with a trunk or main body 20, which directly supports the tool-holder spindle 3 and is fixed to the distal end of the movable supporting structure 4, or rather to the lower end of head-holder beam 17, so as to be able to rotate around the reference axis C; and with a first, preferably electrically- or hydraulically-operated, electronically-controlled drive device (not shown in the figures) which is capable of rotating, on command, the trunk or main body 20 around axis C, so as to be able to vary, on command, the angular position of the spindle assembly 20 relative to a predetermined angular reference.

In the example shown, in particular, the first drive device of tool-carrying head 2 is preferably housed inside the head-holder beam 17.

The tool-holder spindle 3, on the other hand, is preferably firmly fixed to the trunk or main body 20 with the capability of rotating/swivelling around the reference axis D, and the tool-carrying head 2 is preferably also provided with a second, preferably electrically- or hydraulically-operated, electronically-controlled drive device (not shown in the figures) which is capable of rotating/swivelling on command, the tool-holder spindle 3 around the axis D so as to be able to change the angular position of spindle 3 relative to a predetermined angular reference.

More in detail, in the example shown, the second drive device of tool-carrying head 2 is preferably housed inside the trunk or main body 20, and is preferably adapted to rotate/swivel the tool-holder spindle 3 about axis D so as to be able to vary, on command, the angle of inclination of the tool-holder spindle 3 relative to the vertical.

The electronic control device 5, in turn, is preferably adapted to control/command the drive devices 12, 15 and 18 of movable supporting structure 4, and optionally also the drive device/s (not shown in the figures) of tool-carrying head 2, so as to be able to automatically move and orient the tool-holder spindle 3 in the space above the piece-holder platform 10.

More in detail, in the example shown the electronic control device 5 is preferably programmed/configured so as to control/command the drive devices 12, 15 and 18 of movable supporting structure 4 based on the signals arriving from a series of position sensors (not shown in the figures), or rather from a series of linear position transducers, that are suitably placed/distributed on the movable supporting structure 4. Preferably the electronic control device 5 is moreover programmed/configured so as to control/command the two drive devices of tool-carrying head 2 based on the signals arriving from two further position sensors (not shown in the figures), or rather from two angular position transducers, that are placed on the tool-carrying head 2.

Linear and angular position transducers are components (position sensors) already largely used in the numerical-control machine tool industry, and therefore they will not be described any further.

With reference to FIGS. 1, 2 and 3, moreover, number 100 denotes as a whole a detection device particularly adapted to be used for the automatic calibration of a numerical-control machine tool.

More in detail, detection device 100 is adapted to be temporarily fixed to the tool-carrying head 2 of machine tool 1, and is moreover adapted to measure, preferably in continuous manner, the values of the tilting of the same detection device 100 relative to a predetermined reference inertial plane (not shown) which is immobile/fixed in space, i.e. has a constant attitude, and is preferably also horizontal.

In other words, the detection device 100 is preferably adapted to measure the instantaneous values of the roll angle and/or pitch angle and/or yaw angle of the same detection device 100.

In addition, the detection device 100 is preferably also adapted to communicate, preferably in continuous manner and preferably via optical and/or wireless signals, the measured values of the tilting of the same detection device 100 relative to said reference inertial plane, i.e. the current values of the roll angle and/or pitch angle and/or yaw angle, to the electronic control device 5 of machine tool 1.

In other words, detection device 100 is adapted to transmit to the outside, preferably in real time, the current values of the tilting of the same detection device 100 relative to a predetermined reference inertial plane (not shown) that is immobile/fixed in the space, i.e. has a constant attitude, and is preferably horizontal.

More in detail, the detection device 100 is preferably adapted to be temporarily fitted into the tool-holder spindle 3 of machine tool 1, preferably so as to jut out underneath the tool-carrying head 2, and is adapted to provide at output, or rather to transmit to the electronic control device 5, the values of the tilting (roll angle and/or pitch angle and/or yaw angle) of the tool vector associated with/corresponding to the detection device 100, relative to said reference inertial plane.

With reference to FIG. 3, the detection device 100 in particular comprises: a rigid supporting structure 101, preferably at least partially made of metal material, which is adapted to be fixed in removable manner to the tool-carrying head 2 of machine tool 1, preferably jutting out beneath the same tool-carrying head 2; and one or more inclinometer sensors 102 that are fixed to the rigid supporting structure 101, and are adapted to measure/determine, preferably in continuous manner, the tilting of the rigid supporting structure 101 relative to a reference inertial plane which is immobile/fixed in the space, i.e. has a constant attitude, and is preferably horizontal.

In other words, the inclinometer sensor/s 102 is/are preferably structured to measure/determine, preferably in continuous manner, the roll angle and/or the pitch angle and/or the yaw angle of the rigid supporting structure 101.

Preferably, the inclinometer sensor/s 102 moreover has/have a precision exceeding one thousandth of a degree.

Moreover the detection device 100 additionally comprises an electronic control unit 103 that is preferably firmly fixed to the rigid supporting structure 101, is electronically connected to the inclinometer sensor/s 102, and is capable of transmitting to the outside of the device, preferably via optical and/or wireless signals, the measurements (roll angles and/or pitch angles and/or yaw angles) made by the inclinometer sensor/s 102.

More in detail, the electronic control unit 103 is preferably adapted to transmit the measurements (roll angles and/or pitch angles and/or yaw angles) made by the inclinometer sensor/s 102 to the electronic control device of machine tool 1, preferably via optical or wireless signals.

Moreover, the detection device 100 preferably also comprises an electric-energy accumulator 104, preferably of a rechargeable type, which is firmly fixed to the rigid supporting structure 101, and is adapted to power the inclinometer sensor/s 102 and the electronic control unit 103.

With reference to FIG. 3, in the example shown, in particular, the rigid supporting structure 101 is preferably structured to be fixed/fixable in a rigid, though removable manner to the tool-holder spindle 3 of machine tool 1.

Clearly, the rigid supporting structure 101 can be fixed to the tool-holder spindle 3 by hand or in an automatic manner by the machine tool 1.

In addition, the rigid supporting structure 101 preferably has, inside itself, a cavity or compartment that accommodates the inclinometer sensor/s 102, the electronic control unit 103 and preferably also the electric-energy accumulator 104.

More in detail, the rigid supporting structure 101 is preferably provided with a large coupling shank 110, preferably made of a metal material, which is specifically shaped/dimensioned so as to be fitted in removable manner into, and be firmly held by, the tool-holder spindle 3 of machine tool 1.

In addition, the rigid supporting structure 101 preferably comprises: a plate-like rigid body 111 preferably made of metal material, which is rigidly fixed to the base of the coupling shank 110, preferably so as to be substantially perpendicular to the longitudinal axis L of the shank; and optionally also a protective cap 112, preferably made of a plastic material, which is roughly bell-shaped and is fitted on/coupled to the plate-like rigid body 111, on opposite side with respect to the coupling shank 110, so as to form/delimit a closed cavity.

In the example shown, therefore, the tool vector associated with detection device 100 preferably coincides with the longitudinal axis L of coupling shank 110.

The inclinometer sensor/s 102, the electronic control unit 103 and preferably also the electric-energy accumulator 104, in turn, are preferably firmly fixed to the plate-like rigid body 111, preferably on the opposite side with respect to the protruding shank 110 and preferably underneath the protective cap 112.

In other words, the inclinometer sensor/s 102, the electronic control unit 103 and the electric-energy accumulator 104 are preferably accommodated inside the cavity delimited by the protective cap 112 and by the plate-like rigid body 111.

In the example shown, in particular, the inclinometer sensor/s 102 is/are preferably directly fixed to the lower face of the plate-like rigid body 111, on the opposite side with respect to the protruding shank 110. The electronic control unit 103 and preferably also the electric-energy accumulator 104, on the other hand, are preferably fixed to a rigid intermediate framework 113 which, in turn, is fixed to the plate-like rigid body 111, on the opposite side relative to the coupling shank 110.

Hence, the inclinometer sensor/s 102 are arranged between the plate-like rigid body 111 and the electronic control unit 103, on the opposite side relative to the coupling shank 110.

With reference to FIG. 3, in the example shown, moreover, the detection device 100 is preferably provided with two single-axis inclinometer sensors 102 that are fixed/placed on the rigid supporting structure 101, or rather to the lower face of the plate-like rigid body 111, perpendicular to one another, so as to be able to detect the tilting relative to two reference axes orthogonal to one another. Preferably, the two inclinometer sensors 102 are furthermore placed/fixed on the rigid supporting structure 101, or rather on the plate-like rigid body 111, so as to be substantially coplanar to one another.

Hence, the first inclinometer sensor 102 is adapted to measure, in real time, the roll angle of the rigid supporting structure 101, whereas the second inclinometer sensor 102 is adapted to measure, in real time, the pitch angle of the rigid supporting structure 101.

Preferably the inclinometer sensor/s 102 of detection device 100 is/are furthermore MEMS inclinometer sensor/s (acronym of Micro Electro-Mechanical Systems).

In the example shown, in particular, the inclinometer sensors 102 are preferably MEMS inclinometer sensors produced by SHANGHAI VIGOR TECHNOLOGY DEVELOPMENT Co. Ltd., by the American company JEWELL INSTRUMENTS LLC or by the Italian-French multinational corporation ST MICRO ELECTRONICS.

Being components easy to find on the market, the MEMS inclinometer sensors will not be described any further.

The electronic control unit 103, on the other hand, is preferably programmed/configured so as to collect and transmit, in real time to the electronic control device 5, the measurements (i.e. the roll angle and the pitch angle) carried out by the two single-axis inclinometer sensors 102.

With reference to FIGS. 1 and 2, the electronic control device 5 of machine tool 1, in turn, is preferably programmed/configured so as to receive and process the measurements (roll angles and/or pitch angles) carried out by the detection device 100 in order to create and/or store at least one digital map M (schematically shown in FIG. 1) that contains the actual values of the tilting (roll angles and/or pitch angles and/or yaw angles) of the detection device 100, or rather of the tool vector associated with the detection device 100, in a multitude of control points belonging to a same detection plane P that is placed at a given height/altitude from the ground, or rather from the basement 9.

In other words, the detection plane P is preferably arranged horizontally.

Clearly the digital map M additionally contains the spatial coordinates of each control point of the detection plane P where the tilting of detection device 100 was measured.

In addition, the control points are preferably associated with a tool-holder spindle 3 arranged in a vertical position, and are preferably spaced apart from one another in a substantially regular/uniform manner on the whole detection plane P.

More in detail, the electronic control device 5 of machine tool 1 is preferably programmed/configured so as to create and store inside itself a plurality of digital maps M, each associated with a different height of the tool-carrying head 2.

In the example shown, moreover, the/each digital map M contains the roll angles and pitch angles of the detection device 100, or rather of the tool vector associated with the detection device 100, in all the control points of the detection plane P.

Preferably, the electronic control device 5 of machine tool 1 is finally programmed/configured so as to correct, point by point during the machining of the piece, the spatial position (centre of the tool) and/or the orientation of the tool mounted on the tool-holder spindle 3, based on the actual tool-vector tilting values present in the digital map/s M mentioned above.

Operation of machine tool 1 is easily inferable from the description above.

Under ideal conditions, assuming that the tool-holder spindle 3 is locked in a vertical position, the detection device 100 should detect, in each point of the detection plane P, tilting values of the tool vector (roll angle and pitch angle) always equal to zero.

In reality, due to the geometric deformations to which the movable supporting structure 4 is normally subjected (the deformations can be due, for example, to a non-uniform sinking of the foundations, to local thermal expansions, to an increase in the mechanical clearances and/or in the wear of moving mechanical members), the detection device 100 measures, in each point of detection plane P, tilting values of the tool vector (roll angle and pitch angle) that vary from point to point and are normally slightly different from zero, i.e. are always different from the ideal design values.

The electronic control device 5 of machine tool 1 can use, in real time during the machining of the piece, the aforesaid digital map/s M in order to determine, in the point in which the tool is momentarily located, the difference of the tool-vector tilting (roll angle and pitch angle) relative to the ideal values, and hence to correct/compensate in real time the spatial position and/or the orientation of the tool mounted on tool-holder spindle 3.

As far as the calibration of the machine tool 1 is concerned, on the other hand, the operating method of machine tool 1 firstly comprises the step of placing/fixing the detection device 100 on the tool-carrying head 2 of the machine tool 1.

More in detail, the operating method of machine tool 1 preferably comprises the step of fitting the detection device 100 into the spindle 3 of the tool-carrying head 2, and in addition the step of locking/immobilizing the tool-holder spindle 3 in a predetermined position.

More in detail, during calibration of machine tool 1, the operating method of machine tool 1 preferably comprises the step of placing/orienting and then locking the tool-holder spindle 3 in a predetermined and preferably vertical position, so that the tool vector corresponding to the detection device 100, i.e. the axis L, is theoretically in a vertical position.

After having placed/fixed the detection device 100 in the tool-carrying head 2, the operating/calibration method of machine tool 1 comprises the steps of
- moving the tool-carrying head 2 in space so as to place the detection device 100 on a given detection plane $P_1$; and then
- moving the tool-carrying head 2 in space, preferably always parallel to the detection plane $P_1$, so as to place the detection device 100 in succession in a multitude of control points spread on said detection plane $P_1$, and to create at least a first digital map $M_1$ that contains the tilting values of the detection device 100 relative to the reference inertial plane in each of said control points of detection plane $P_1$.

Preferably, the detection plane $P_1$ is furthermore horizontal.

In other words, during the calibration, the operating method of machine tool 1 preferably comprises the steps of:
- placing the tool-carrying head 2 at a predetermined height from the ground, or rather from the basement 9, so as to place the detection device 100 on a detection plane $P_1$ which is arranged at a given height $h_1$ from the ground, or rather from the basement 9;
- moving the tool-carrying head 2 horizontally back and forth (i.e. moving along the X and Y axes) so as to place the detection device 100 in a multitude of control points distributed on the detection plane $P_1$;
- creating at least a first digital map $M_1$ containing the tilting values (roll angle and pitch angle) of the detection device 100 relative to the reference inertial plane, or rather the tilting values of the tool vector associated with the detection device 100, in the single control points belonging to detection plane $P_1$.

More in detail, the creation of the digital map $M_1$ preferably provides to process the signals arriving from the detection device 100 in order to determine and store the tilting values (roll angle and pitch angle) of the detection device 100, or rather of the tool vector associated with the detection device, in all the control points of detection plane $P_1$.

Preferably said control point are moreover distributed in a substantially regular/uniform manner on the whole detection plane $P_1$.

After having created/processed the digital map $M_1$ associated to detection plane $P_1$, the operating/calibration method of machine tool 1 preferably additionally comprises the steps of:
- moving the tool-carrying head 2 in space so as to place the detection device 100 on a given second detection plane $P_2$, which is distinct from and parallel to the detection plane $P_1$; and then
- moving the tool-carrying head 2 in space, preferably always parallel to detection plane $P_2$, so as to place the detection device 100 in succession in a multitude of control points distributed on the detection plane $P_2$, and create a second digital map $M_2$ that contains the tilting values of detection device 100 relative to the reference inertial plane in the single control points of detection plane $P_2$.

More in detail, the operating/calibration method of machine tool 1 preferably additionally comprises the steps of:
- vertically moving the tool-carrying head 2 (i.e. moving along axis Z) so as to place the detection device 100 on a second detection plane $P_2$ which is arranged at a predetermined height $h_2$ from the ground, or rather from the basement 9, which is greater or smaller than height $h_1$; and then
- moving the tool-carrying head 2 horizontally back and forth (i.e. moving along X and Y axes) so as to place the detection device 100 in a multitude of control points distributed on detection plane $P_2$;
- creating at least a second digital map $M_2$ containing the tilting values (roll angle and pitch angle) of the detection device 100 relative to the reference inertial plane, or rather the tilting values of the tool vector associated with the detection device 100, in all the control points belonging to the detection plane $P_2$.

In addition, during the calibration procedure, the operating method of machine tool 1 preferably provides to reiterate/repeat n-times the three steps indicates above, so as to create a series/plurality of digital maps $M_n$, each univocally associated with a respective detection plane $P_1$ and containing the tilting values (roll angle and pitch angle) of the detection device 100 relative to the reference inertial plane in a multitude of control points belonging to said detection plane $P_n$.

In other words, during the calibration procedure, the operating method of machine tool 1 provides to vertically move the tool-carrying head 2 n-times, so as to place the detection device 100 in succession on a series of detection planes $P_2, P_3 \ldots P_n$ parallel to the detection plane $P_2$, and to create a series of digital maps $M_2, M_3 \ldots M_n$, each containing the tilting values (roll angle and pitch angle) of the detection device 100 in a multitude of control points belonging to the corresponding detection plane $P_2, P_3 \ldots P_n$.

Preferably, the detection planes $P_1, P_2 \ldots P_n$ are moreover arranged at a predetermined and constant distance from one another. In other words, the detection planes $P_1, P_2 \ldots P_n$ are preferably vertically spaced apart from one another in a regular manner.

Clearly the above-described operating/calibration method of machine tool 1 can be similarly implemented when the detection device 100 is permanently fixed to the tool-carrying head 2.

In other words, the detection device 100 is incorporated in the tool-carrying head 2.

The advantages resulting from calibration of machine tool 1 via the detection device 100 are remarkable.

First of all, experimental tests have shown that the procedure described above allows a machine tool to be calibrated much quicker than any laser system, with all the operating advantages that this entails.

Furthermore, the calibration procedure described above can be used even when a piece to be machined is stationary on the piece-holder platform 10, with all the operating advantages that this entails.

In this case, in fact, the electronic control device 5 moves the tool-carrying head 2 horizontally so as to prevent the detection device 100 from hitting, when moving on detection plane $P_n$, the piece to be machined.

In addition the operating/calibration method described above can be used to create one or more digital maps M only in the neighbourhood of the piece to machined or of a part thereof.

Finally, since it is designed to be fitted into the tool-holder spindle 3 of machine tool 1, the detection device 100 can be considered and handled by the numerical-control machine tool like any other tool of the machine.

In other words, the detection device 100 can be housed in the tool-holding magazine of machine tool 1 together with the other tools of the machine and can be picked up and fitted into the tool-holder spindle 3 via a normal tool change procedure.

It is finally clear that modifications and variants may be made to the machine tool 1 and to the calibration method described above without however departing from the scope of the present invention.

Figure 4:
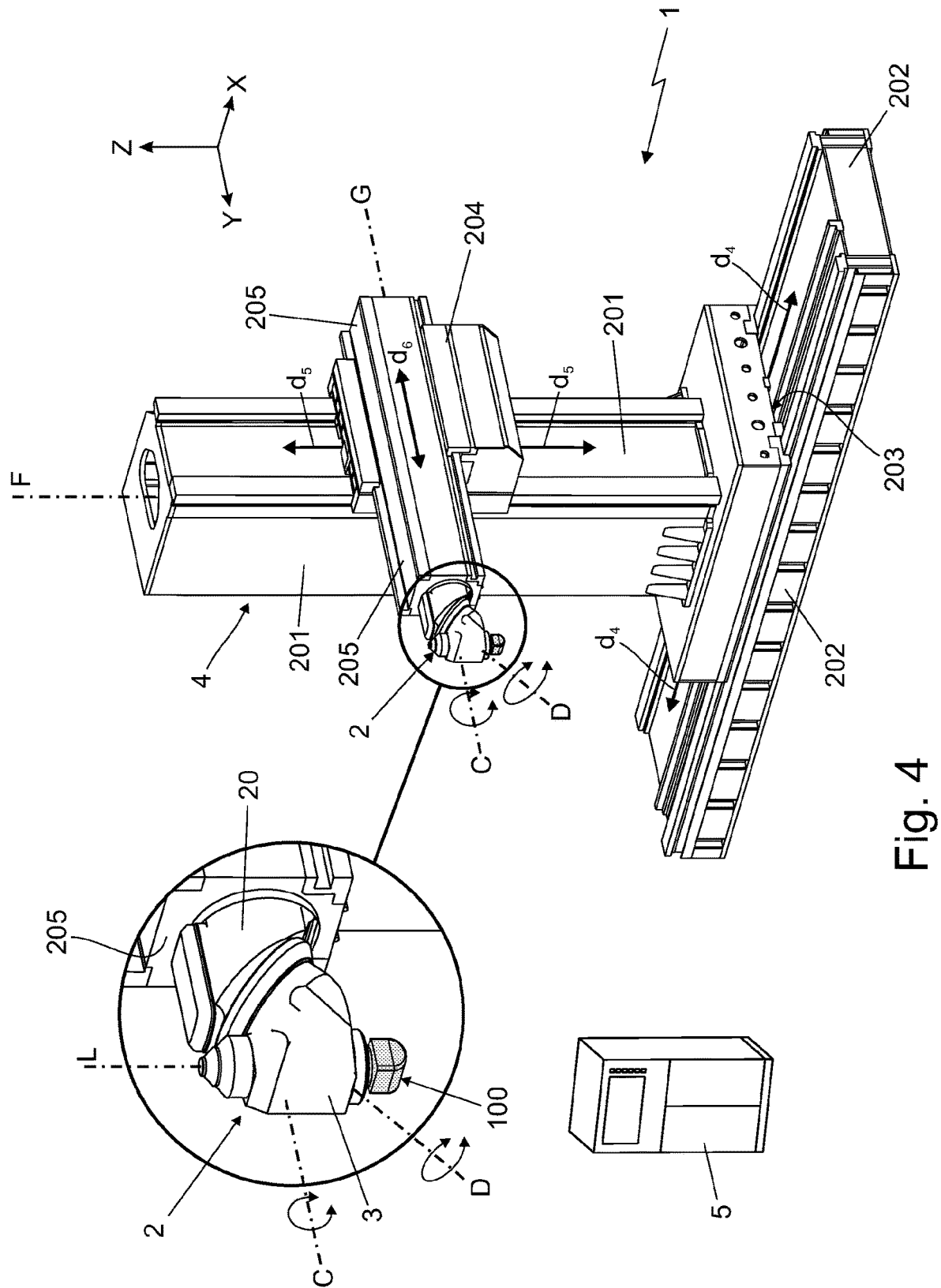
FIG. 4 is an axonometric view of a different embodiment of the numerical-control machine tool shown in FIG. 1, with parts removed for sake of clarity.

For example, with reference to FIG. 4, in a different embodiment, the movable supporting structure 4 of machine tool 1 could be a movable upright structure.

In other words, the movable supporting structure 4 may comprise: a big, preferably substantially parallelepiped in shape, movable supporting column 201 that juts out from an oblong-shaped support platform 202 in a substantially vertical direction, i.e. parallel to the Cartesian axis Z, and is capable of horizontally moving along the same support platform 202 in a horizontal direction $d_4$ which is substantially parallel to Cartesian axis X and perpendicular to the longitudinal axis F of the same supporting column 201; and a preferably electrically-operated or hydraulically-operated, drive device 203 which is adapted to move, on command, the supporting column 201 back and forth along the support platform 202 in direction $d_4$.

In addition, in this alternative embodiment, the movable supporting structure 4 moreover comprises: a movable slide 204, which is mounted slidable along the lateral side of supporting column 201, parallel to the column longitudinal axis F, so as to be able to freely move along the body of supporting column 201 in a direction $d_5$ parallel to the column longitudinal axis F, i.e. in a direction substantially vertical and parallel to the Cartesian axis Z; and a second, preferably electrically- or hydraulically-operated, drive device (not shown in the figure) which is adapted to move, on command, the movable slide 204 upwards and downwards along the supporting column 201, in direction $d_5$, so as to vary the height of the movable slide 204 from the ground.

With reference to FIG. 4, in this alternative embodiment, furthermore, the movable supporting structure 4 additionally comprises: a long, straight and preferably also substantially prism-shaped, head-holder beam 205 that extends cantilevered and horizontally from movable slide 204, orthogonally to the column longitudinal axis F and to direction $d_5$, i.e. while remaining substantially parallel to Cartesian axis Y, and is coupled in sliding manner to the slide 204 so as to be able to move in a direction $d_6$ that is locally parallel to the longitudinal axis G of head-holder beam 205, i.e. parallel to Cartesian axis Y; and a third, preferably electrically- or hydraulically-operated, drive device (not shown in the figure) which is adapted to move, on command, the head-holder beam 205 back and forth on the movable slide 204, in direction $d_6$, so as to vary, on command, the length of the portion of head-holder beam 205 that juts out from the support column 201 parallel to the ground.

The tool-carrying head 2 is obviously arranged at the distal end of head-holder beam 205.

More in detail, in this embodiment, the tool-carrying head 2 is preferably fixed in axially rotatable manner to the distal end of head-holder beam 205, with the capability of rotating around a reference axis C substantially parallel to, and optionally also coinciding with, the longitudinal axis G of head-holder beam 205, i.e. substantially horizontal.

The tool-holder spindle 3, on the other hand, is preferably mounted on the trunk or main body 20 of tool-carrying head 2 with the capability of rotating/swivelling around a reference axis D that is preferably, though not necessarily inclined by approximately 45° relative to axis C and/or to the longitudinal axis G of head-holder beam 205.

With reference to FIG. 4, also in this case, the operating method of machine tool 1 preferably provides to place/orient and then lock, during the calibration procedure of machine tool 1, the tool-holder spindle 3 in a predetermined operating position such that the tool vector corresponding to the detection device 100, i.e. the axis L, is theoretically in a vertical position.

In a less sophisticated embodiment, finally, the detection device 100 could communicate with the electronic control device 5 through electric signals.

In other words, the detection device 100 could be connected to the electronic control device 5 through cables.

The invention claimed is:

1. An operating method of a numerical-control machine tool that comprises: a tool-carrying head (2) which is provided with a tool-holder spindle (3) capable of accommodating tools for machining a piece; a movable supporting structure (4) that supports said tool-carrying head (2), and is provided with moving members (12, 15, 18) that are adapted to move the tool-carrying head (2) in a space surrounding the piece to be machined, during machining of the piece; and an electronic control device (5) that controls one or more moving members (12, 15, 18) of the movable supporting structure (4), said operating method including, before machining of the piece, a calibrating procedure comprising the steps of:

fitting a detection device (100) into the tool-holder spindle (3) of the tool-carrying head (2), the detection device (100) being adapted to measure values of tilting of the detection device (100) relative to a predetermined reference inertial plane;

moving the tool-carrying head (2) in space so as to place said detection device (100) in succession in a multitude of control points spread on a first detection plane ($P_1$) and to generate signals based on measurements taken in the multitude of control points, and processing the signals arriving from the detection device (100) to create at least a first digital map ($M_1$) that contains the tilting values of the detection device (100) relative to the reference inertial plane, in each of said control points; and said operating method additionally comprising the step, during machining of the piece, of continuously correcting at least one of the spatial position and the orientation of a machining tool based on said first digital map (M1) that differ from ideal design values due to deformations associated with the movable supporting structure (4).

2. The operating method of a numerical-control machine tool according to claim 1, wherein the calibrating procedure further comprises the steps of:

moving the tool-carrying head (2) in space so as to place said detection device (100) in succession in one or more further detection planes ($P_2, P_3, P_n$), parallel to and distinct from said first detection plane ($P_1$);

moving the tool-carrying head (2) in space so as to place said detection device (100) in succession in a multitude of further control points spread on each of said further detection planes ($P_2$, $P_3$, $P_n$) and to generate further signals based on measurements taken in the multitude of further control points, and processing the further signals arriving from the detection device (100) to create a corresponding number of further digital maps ($M_2$, $M_3$, $M_n$) each of which further digital maps ($M_2$, $M_3$, $M_n$) contains tilting values of the detection device (100) relative to the reference inertial plane, in all the further control points belonging to a same further detection plane ($P_2$, $P_3$, $P_n$).

3. The operating method of a numerical-control machine tool according to claim 1, wherein said first detection plane ($P_1$) is horizontal.

4. The operating method of a numerical-control machine tool according to claim 2, wherein said first and further detection planes ($P_1$, $P_2$, $P_3$, $P_n$) are arranged at a predetermined and constant distance from one another.

5. The operating method of a numerical-control machine tool according to claim 1, wherein said control points are spread in a regular and uniform distribution on the corresponding detection plane (P).

6. The operating method of a numerical-control machine tool according to claim 1, wherein the step of processing the signals arriving from the detection device (100) includes determining and storing the tilting values of the detection device (100) in each control point of said detection plane (P).

7. The operating method of a numerical-control machine tool according to claim 1, wherein the step of fitting the detection device (100) into the tool-holder spindle (3) of the tool-carrying head (2) additionally includes the step of blocking immobilizing, or blocking and immobilizing the tool-holder spindle (3) of the tool-carrying head (2) in a predetermined position.

8. A detection device (100) for calibration of a numerical-control machine tool (1) comprising:
a movable tool-carrying head (2) provided with a tool-holder spindle (3);
a rigid supporting structure (101) that is provided with a coupling shank (110) shaped and dimensioned to be fitted in removable manner into the tool-holder spindle (3) of the movable tool-carrying head (2) of the numerical-control machine tool (1); and
one or more inclinometer sensors (102) that are fixed to the rigid supporting structure (101) and are adapted to measure and determine the tilting of said rigid supporting structure (101) relative to a predetermined reference inertial plane.

9. The detection device according to claim 8, additionally comprising an electronic control unit (103) that is electronically connected to said inclinometer sensors (102), and is adapted to transmit outside of the detection device measurements carried out by said one or more inclinometer sensors (102).

10. The detection device according to claim 9, wherein the electronic control unit (103) transmits outside of the detection device the measurements carried out by said one or more inclinometer sensors (102) via at least one of optical signals and wireless signals.

11. The detection device according to claim 10, wherein the rigid supporting structure (101) is provided with a cavity or compartment inside which the inclinometer sensors (102) and the electronic control unit (103) are housed.

12. The detection device according to claim 8, wherein the one or more inclinometer sensors (102) comprises two inclinometer sensors (102) which are fixed and arranged on the rigid supporting structure (101) orthogonal to one another, so as to measure tilting relative to two reference axes orthogonal to each other.

13. The detection device according to claim 8, wherein said one or more inclinometer sensors (102) are MEMS inclinometer sensors.

14. A numerical-control machine tool (1) comprising:
a tool-carrying head (2) including a tool-holder spindle (3) capable of accommodating a tool;
a movable supporting structure (4) that supports said tool-carrying head (2), and is provided with moving members (12, 15, 18) that are adapted to move the tool-carrying head (2) in space surrounding a piece to be machined, during machining of the piece; and
an electronic control device (5) that controls at least the moving members (12, 15, 18) of the movable supporting structure (4);
wherein the electronic control device (5) is capable of communicating with the detection device (100) as claimed in claim 8, to receive the measurements carried out by the one or more inclinometer sensors (102).

* * * * *